(No Model.)
J. L. LAUGHLIN.
AGRICULTURAL IMPLEMENT.
No. 420,727.  Patented Feb. 4, 1890.
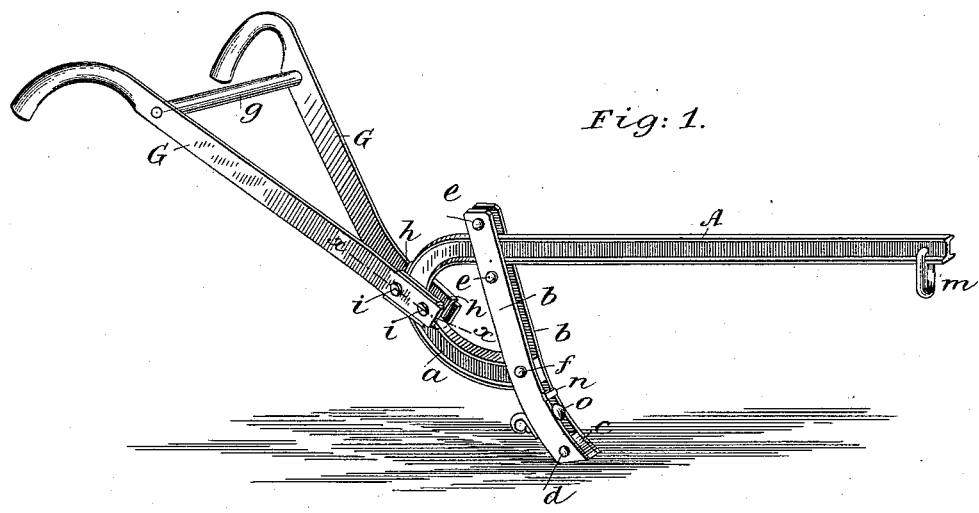
Fig. 1.
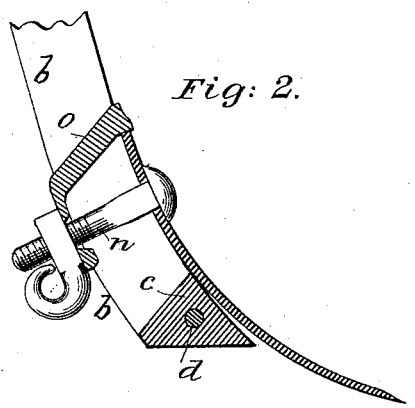
Fig. 2.
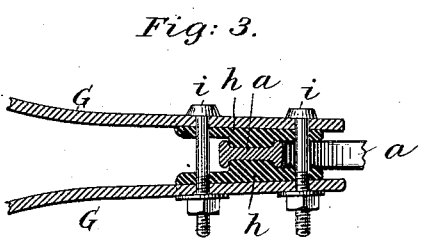
Fig. 3.
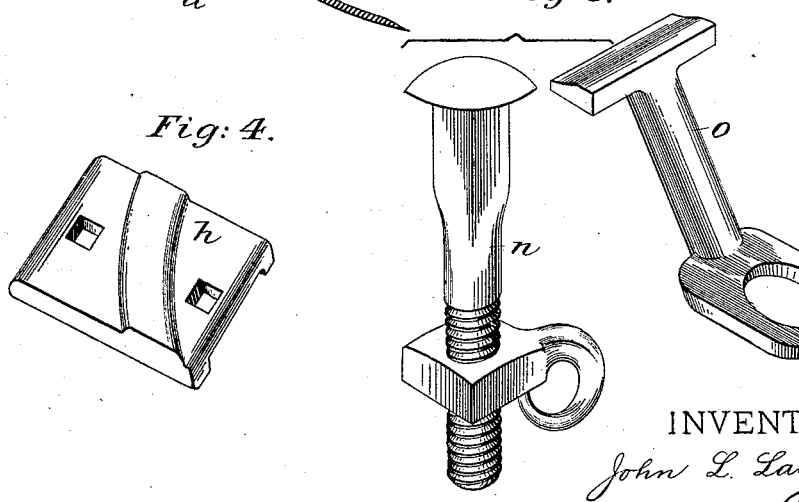
Fig. 4.
Fig. 5.
WITNESSES:
John A. Rennie
A. M. Williamson
INVENTOR:
John L. Laughlin
By J. N. McIntire
Attorney.

UNITED STATES PATENT OFFICE.

JOHN L. LAUGHLIN, OF LOUISVILLE, KENTUCKY, ASSIGNOR TO B. F. AVERY & SONS, OF SAME PLACE.

AGRICULTURAL IMPLEMENT.

SPECIFICATION forming part of Letters Patent No. 420,727, dated February 4, 1890.

Application filed October 3, 1889. Serial No. 325,846. (No model.)

*To all whom it may concern:*

Be it known that I, JOHN L. LAUGHLIN, of Louisville, in the county of Jefferson and State of Kentucky, have invented a new and useful Improved Agricultural Implement; and I do hereby declare that the following is a full, clear, and exact description of the same, reference being had to the accompanying drawings, forming part of this specification.

My invention relates to that type of stock or implement supporting contrivance which is designed to have attached to the lower portion thereof different sorts of cultivating implements or blades—such, for instance, as a bull-tongue, a sweep, a turn-shovel, a scraper, a scooter, &c.—which various blades are now so commonly used in the South.

My invention has for its main object to provide for use a stock of this type which shall be exceedingly economic of manufacture, simple, strong, and durable in its construction, and at the same time possessing all the requisite capacities for such relative adjustment of its parts as are necessary to render such a contrivance or implement most desirable in practical operation.

To this main end and object my invention may be said to consist, essentially, in the novel features of construction and combinations of devices which will be hereinafter more fully explained, and which will be found more explicitly defined and more particularly pointed out in the claims of this specification.

To enable those skilled in the art to which my improvements relate to make and use an agricultural implement or contrivance embracing either one or all of the features of my invention, I will now proceed to more fully describe the latter, referring by letters to the accompanying drawings, which form part of this specification, and in which I have shown my invention carried out in that form which is about the best now known to me.

In the drawings, Figure 1 is a perspective view of a contrivance made according to my invention, and illustrated as having no sort of blade or device attached to the stock, in order that the drawing may better exhibit the entire detail construction of the latter. Fig. 2 is a partial vertical central section drawn on a somewhat enlarged scale and showing a portion of the standard with one of the blades such as usually applied to the standard attached or secured thereto in working condition. Fig. 3 is a detail sectional view at the line $x\ x$ of Fig. 1 and drawn on about the same scale as Fig. 2. Fig. 4 is a view of one of the castings or metallic devices, two of which are employed for the purpose of effecting in proper retention with the curved back portion of the beam the lower ends of the handles of the implement. Fig. 5 shows detached the heel-bolt and T-washer, preferably employed for the purpose of fastening to the lower portion of the standard any one of the vrrious blades or devices designed to be used in connection with the improved stock.

In the several figures the same part will always be found designated by the same letter of reference.

A represents the beam, which is, as shown, composed of a single piece of channel-iron, preferably of I shape in cross-section, and having its back end or portion $a$ bent, as shown, into a curve, which is preferably a part of a true circle. To the lowermost end of this curved or bent portion $a$ of the beam A are pivotally secured, by means of a suitable bolt $f$, two pieces of flat steel $b\ b$, similar in size and shape and possessing the proper contour to constitute, when properly arranged and secured in position, the standard of the implement. These steel parts $b\ b$ have securely fastened between the lowermost portions of their adjacent sides, by a bolt $d$, a separating-washer $c$, arranged about as shown in the drawings, and so that the standard presents the conditions of a sufficiently solid and strong foot for the proper support of the blade or device to be secured to it, in a manner which will be presently described. The upper end portions of the said steel bars $b\ b$ straddle or encompass laterally the rear portion of the horizontal or straight part of the metallic beam A, and are securely fastened to said beam (but in a removable manner) by suitable bolts $e\ e$, which pass through the said bars at points immediately above and immediately below the metallic beam A, all as clearly shown. By this construction of standard and beam and the mode shown and described of securing together these two parts of the contrivance the standard, it will be seen, may be adjusted to and held in any desired relationship to the beam and at any requisite degree of obliquity to the surface of the ground by simply loosening the clamping-bolts $e$ $e$, then swinging or turning the standard upon the pivotal bolt $f$, and then re-clamping the upper portion of the standard to the metallic beam by tightening up said bolts $e$ $e$. The forward end of the metallic beam may be provided, as shown at $m$, with any suitable device or means for effecting the attachment to the beam of the draft power or team.

G G are suitable wooden handles, of any approved pattern, connected near the handle-like portions by the usual rung or cross-bar $g$, and having their lowermost ends securely fastened to the curved portion of the metallic beam A. As shown, the securement of the ends of the handles G to said metallic beam is effected through the medium of suitable clamping or securing bolts $i$ $i$, which pass through the lowermost portions of the handles at such points as to just properly clear the inner and outer peripheral portions, so to speak, of the curved part of the metallic beam, suitable metallic blocks or castings $h$ $h$ being arranged or placed intermediate of each handle-piece and that side of the metallic beam which is adjacent to the inner surface of said handle-piece, each of said castings or metallic shoe-pieces being formed or patterned so as to have one side fit or conform to the indented or depressed shape of the curved part $a$ of the beam A, while its other or opposite surface is plane or flat to afford a perfect bearing to that part of the lowermost portion of the wooden handle G which bears against it. By this detail construction or arrangement of parts for effecting the securement of the lower ends of the handles G G to the curved portion $a$ of the metallic beam, not only is the securement of the handles to the beam effected in a perfectly efficient manner and by means exceedingly economic of manufacture, but the attachment is also effected in such manner that by simply loosening the clamping-bolts $i$ $i$ the handles of the implement may be adjusted to any desired position and then be resecured in such adjustment by tightening the said clamping-bolts, the intermediately-arranged metallic shoe-pieces or castings $h$ $h$ being adapted to move up and down in conformity to and in engagement with the laterally recessed and curved portion $a$ of the metallic beam A.

$o$ and $n$ are respectively a T-washer and heel-bolt, by means of which any one of the several blades or devices which may be used on the improved stock is securely fastened in the proper relative position to the lowermost forward portion of the metallic standard. As will be readily seen by reference to the drawings, in the securement thus to the standard of the blade to be used by the devices just above mentioned the bolt passes first through a hole in said blade, thence through the space or opening between the two steel bars $b$ $b$ which comprise the standard, and thence through the hole in the malleable T-washer, and when drawn home tight the upper end of the blade is forced against the T end of the washer, which forms a firm abutment or bearing for it.

In carrying my invention into effect a modification may be made by the dispensation of the stem of the said T-washer, in which case, however, the lower end of the metallic beam should be allowed to project beyond the flat surfaces or faces of the standard pieces $b$ $b$, in order that such projecting portion may then constitute the abutment for the blade and thus take the place of the T-washer.

Of course a metallic beam of some other form in cross-section than the I shape shown and described may be employed without departing from the spirit of my invention, and in carrying the latter into effect a single beam and the associated devices shown may be employed, or a duplex beam to constitute a double stock or a gang of the requisite parts may be employed for constituting, for instance, a riding or walking cultivator.

Of course various changes or modifications in the form, size, and proportions, as well as in the precise detail construction of any of the parts, may be made without materially changing the character of the implement shown and described, so far as it embodies my alleged improvements, and either one or more of the separate features of improvement may be embodied in a single implement with more or less benefit. I therefore wish it to be understood that I do not restrict my claims of invention to an implement or contrivance embodying at once all of the separable features of invention made the subject of my claims; but, Having so fully described the construction and operation of my improved contrivance that those skilled in the art can practice my invention, either wholly or in part, and in either the precise form in which I have shown it carried out or under some modification thereof, what I claim as new, and desire to secure by Letters Patent, is—

1. In a contrivance or implement of the type shown and described, in which the beam and standard are relatively adjusted without varying the relationship of the beam with the handles, the combination, with the metallic beam having its rear end curved downwardly, substantially as shown and described, of a metallic standard pivotally attached to the lower portion of the curved part of said beam and having its uppermost portion adjustably combined with the straight part of the metallic beam, and also having its lowermost forward portion adapted to receive and to support any suitable blade or cultivating device, the whole constructed, arranged, and operating together in substantially the manner and for the purposes hereinbefore set forth.

2. In combination with a metallic beam A, composed of suitable channel-iron and having its rear end or portion curved, as specified, and a suitable standard for the attachment of cultivating blades or devices, a pair of suitable handles G, and metallic shoe-pieces or bearing-blocks $h\,h$, clamped by suitable bolts $i\,i$ between the adjacent surfaces of the handles and the opposing faces of the curved part $a$ of the beam, all in such manner that by simply loosening and retightening the said clamping-bolts the handles may be adjusted and resecured in any desired position, substantially as hereinbefore set forth.

In witness whereof I have hereunto set my hand this 24th day of September, 1889.

JOHN L. LAUGHLIN.

In presence of—
 N. B. JOHNSON,
 R. D. ANDERSON.